Sept. 14, 1948. H. L. BURNS ET AL 2,449,053
LEAK DETECTOR
Filed Nov. 28, 1944
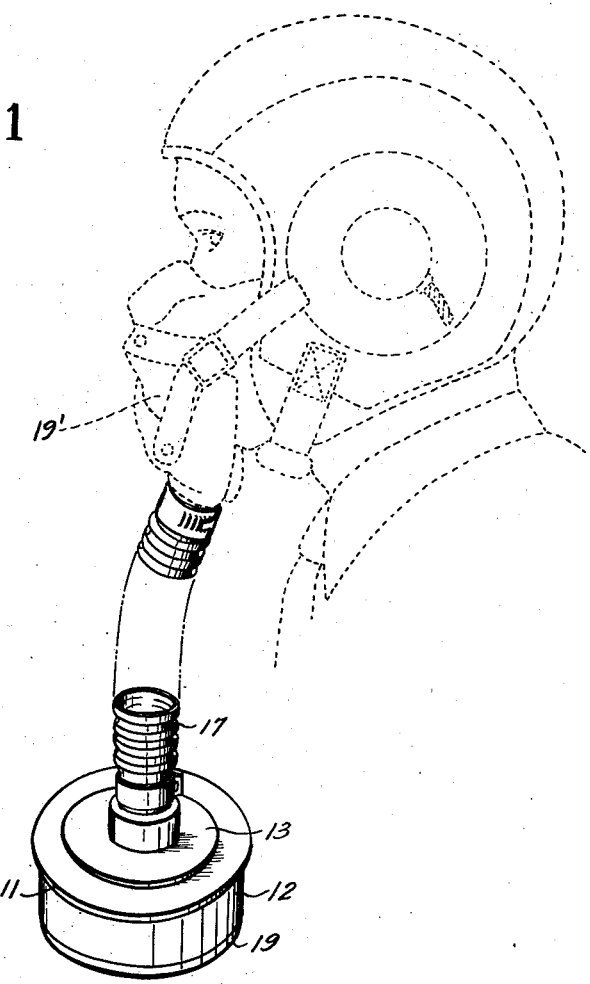
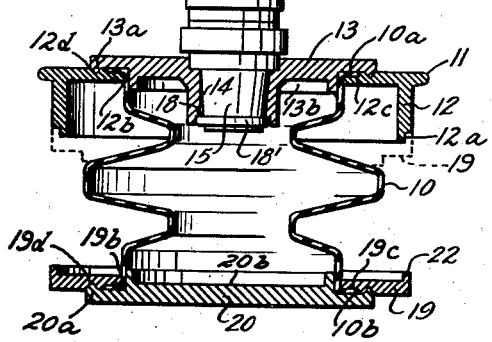
INVENTORS
HENRY L. BURNS
JAMES H. THOMAS
BY
ATTORNEYS Patented Sept. 14, 1948

2,449,053

UNITED STATES PATENT OFFICE 2,449,053

LEAK DETECTOR

Henry L. Burns, Yellow Springs, Ohio, and James H. Thomas, Minneapolis, Minn.

Application November 28, 1944, Serial No. 565,560

4 Claims. (Cl. 73—40)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to leak detectors and more particularly to a leak detector adapted to detect leaks in oxygen demand masks or the like.

One object of the present invention is to provide a leak detector which will be easy to apply and use.

Another object of the invention is to provide a leak detector which will be light and easily portable.

A further object is to provide a leak detector which is simple and economical to manufacture.

Other objects will become apparent from the accompanying drawings, which, when taken in connection with the present specifications, disclose a preferred form of the invention.

In terms of broad inclusion, the invention comprises a bellows having an opening in one end thereof to receive the supply end of a supply pipe from a demand type oxygen mask, and a weight on the opposite end of the bellows to expand the bellows to indicate leaks in the mask.

In the drawings:

Fig. 1 is a perspective view of a leak detector embodying the present invention, the leak detector being shown connected to a demand type oxygen mask; and Fig. 2 is a vertical cross-sectional view of the leak detector shown in Fig. 1, but with the bellows extended.

Referring particularly to the drawings, the leak detector comprises a flexible bellows 10 formed of rubber or similar material and secured at its upper end between a casing 12 and a cap 13. Casing 12 is the upper shell of a bellows-housing assembly and is formed as illustrated with a rabbeted edge 12a in its side wall and a central opening 12b in its top wall. A bead 11 is provided at the top edge of casing 12 to facilitate holding of the detector by the user. The bellows 10 is flanged at its top and bottom ends, as shown at 10a and 10b in Figure 2, and the casing 12 and cap 13 form a closure assembly for the top flanged end of the bellows which extends through and has a snug fit in the central opening 12b of the casing. A circular recess 12c and a circular V-groove or notch 12d are provided in the outer face of casing 12 concentric with the central opening 12b. Recess 12c extends around the top edge of the opening 12b and provides a seat for the top flange 10a of the bellows. The V-notch 12d is spaced outwardly of the flange seat 12c and aids in centering the cap 13 on the top face of the casing and over the opening 12b during assembly of the parts so as to substantially close the bellows at its upper end; the portion of the cap opposite the V-groove 12d of the casing being provided with an inwardly projecting circular V-rib 13a fitting the V-notch 12d. In addition to the V-rib 13a, the cap 13 is provided with an inwardly projecting circular flange or ring 13b having a snug fit in the upper end of the bellows and serving, together with the portion of the cap opposite the seated bellows flange 10a, to clamp the top end of the bellows between the casing 12 and the cap 13.

The cap 13 has a central aperture 14 therein which is in communication with the interior of the bellows and which is of a suitable size and shape to receive a mask connector such as the coupling 15 on the inlet hose 17 of a demand type oxygen mask 19'. The aperture 14 has a shoulder 18 which is engaged by a bead 18' on the coupling 15 to secure the coupling in the aperture.

Cover 19 is the lower shell of the bellows-housing assembly and, together with the cap or closure plate 20, forms a closure assembly for the bottom flanged end of the bellows which extends through and has a snug fit in a central opening 19b in the cover. A circular recess 19c and a circular V-groove or notch 19d are provided in the outer face of the cover concentric with the central opening 19b. Recess 19c extends around the bottom edge of the opening 19b and provides a seat for the bottom flange 10b of the bellows. The V-notch 19d is spaced outwardly of the flange seat 19c and aids in centering the plate on the bottom face of the cover and over the opening 19b during assembly of the parts so as to close the bellows at its bottom end; the plate 20 being imperforate and having the portion thereof opposite the V-notch 19d provided with an inwardly projecting circular V-rib 20a fiting the V-notch 19d. In addition to the V-rib 20a, the plate 20 is provided with an inwardly projecting circular flange or ring 20b having a snug fit in the lower end of the bellows and serving, together with the portion of the plate opposite the seated bellows flange 10b, to clamp the bottom end of the bellows between the casing cover 19 and the closure plate 20.

After the bellows 10 has been assembled between the housing members 12 and 13 at one end and between the housing members 19 and 20 at the other end, the said members are cemented together at the V-notches 12d and 19d to make a leaktight mechanical seal with the bellows. Since the bellows is attached and sealed to the housing by being clamped between the housing members at each end, a tight sealing of the ends of the bellows to the end housing members is obtained without cementing the ends of the bellows to the housing members. Hence, when the tester is connected with the mask, the bellows is a leaktight enclosure into and out of which no air can flow except through the mask connector 15. The bottom cover 19 has an upturned flange 22 around the edge thereof which, in the collapsed condition of the bellows, engages with the rabbeted edge 12a of the casing 12 to form a closed container housing the bellows when the device is not in use.

The casing 12, cap 13, bottom cover 19, and plate 20 are preferably formed of plastic to provide a cylindrical light weight instrument and the cover 19 and plate 20 are of such combined weight to expand the bellows and produce a predetermined suction on the interior of the bellows.

*Operation*

In operation, the mask to be tested is worn on the face of the user who holds the detector in a closed horizontal position and plugs it into his mask through the coupling 15, while holding his breath, thus forming a completely closed system. When the bottom cover 19 is released, if there is no leak in the system, the air pressure will hold the bottom cover up in partially extended position. However, if the mask is leaking for any reason, the bellows 10 will expand, and the bottom cover 19 will drop accordingly. The speed with which the bottom cover 19 drops is dependent upon the amount of air leaking into the mask.

Thus if the fit of the mask is such as to allow inflow of external gas, the bottom cover 19 will descend until the detector has reached an extended position as shown in Fig. 2. If the mask fits well, the bottom cover 19 will either remain in a raised position, or will descend so slowly as to indicate that the leak is of such small magnitude as to be considered negligible.

After testing the mask for leaks the leak detector is disconnected from the mask and the coupling 15 plugged into the oxygen supply.

It is realized that the described embodiment of the invention is susceptible to various changes and modifications and that such changes in shape, size and arrangement of parts may be made as fall within the scope of the appended claims.

That which is claimed as new and is desired to be secured by Letters Patent is:

1. A leak detector for a demand-type mask provided with an inlet hose and a male hose-coupling on said hose, said detector comprising a casing having an opening in the top thereof, a cap covering the said opening and having a female fitting thereon adapted to receive the said male hose-coupling, a bottom cover for the said casing having an opening in the bottom thereof, a closure plate covering the said opening in the cover, a bellows having its opposite ends disposed in the openings respectively of the casing and the cover and engaged between the casing and the cap at one end and between the cover and the closure plate at the other end, the female fitting on the cap opening into the said bellows and the said cap and closure plate being secured to the casing and cover respectively to clamp the ends of the bellows therebetween and provide a leaktight enclosure except for the opening in the female fitting, and means to secure the male hose-coupling in the said opening in the female fitting so that the hose connects with the interior of the bellows and provides the only inlet and outlet for the flow of air into and out of the said bellows.

2. A leak tester for a demand type oxygen mask provided with an inlet hose and a connector on the said hose, said tester comprising a cylindrical casing open at its bottom and having an opening in its top wall, a cap on the top wall of the casing and extending over the said opening, said cap being secured to the casing and having an aperture adapted to receive the said connector, a cylindrical cover for the bottom of the casing having an opening in its bottom wall, a closure plate on the bottom wall of the cover and extending over the said opening in the cover, said closure plate being secured to the cover and being imperforate, and a bellows between the casing and the cover and extending through the said openings in each with its upper end clamped between the casing and the cap and its lower end clamped between the cover and the closure plate to provide a leaktight enclosure whereby when the bellows is attached to the mask to be tested no air can pass into or out of the bellows except through the mask connector, the said cover and closure plate being of such combined weight to expand the bellows and produce a predetermined suction on the interior of the bellows during the testing operation.

3. A leak tester for a demand type oxygen mask provided with an inlet hose and a connector on the said hose, said tester comprising a flexible bellows flanged at its top and bottom ends and a closure assembly at each end of the bellows, each closure assembly comprising a housing unit and a cap between which an end of the bellows is secured, the said housing unit having an opening in which the end of the bellows has a snug fit and having in its outer face a recess around the outer edge of the opening to seat the flange of the bellows and a V-notch extending around the seat in outwardly spaced relation thereto, the said cap being on the outer face of the housing unit and extending over the said opening and the recess and the V-notch in the unit and having an inwardly projecting rib fitting the said V-notch and having an inwardly projecting flange fitting snugly in the end of the bellows and serving together with that portion of the cap outside the seated bellows flange to clamp the bellows between the cap and the housing unit, said cap and housing unit being cemented together at the V-notch, the cap of one of the assemblies having an opening adapted to receive and be plugged by the said connector.

4. A leak tester for a demand type oxygen mask comprising a flexible bellows and a closure assembly at each end of the bellows and consisting of a pair of superposed sealing members engaging the end of the bellows along inner and outer surfaces thereof, one member of each assembly having a central opening in which an end of the bellows is received and being a casing having mating contact with the corresponding member of the other assembly to house the bellows therebetween and the other member of each assembly being on the exterior side of its associate casing member and covering the central opening in the said casing member to provide a cap or closure for the end of the bellows, said casing and cap having interengaged portions forming a tongue-and-groove joint on the exterior of the assembly and outwardly of and around the clamped end of the bellows, said members being cemented together at the joint and clamping the engaged end of the bellows therebetween to provide a leaktight seal between the bellows and the closure assembly, one of said assemblies having a female fitting for receiving a male coupling such as the conventional mask connector attached to the inlet hose of the mask to be tested and the other assembly being of a weight to provide a predetermined suction on the interior of the bellows when released to expand the bellows.

HENRY L. BURNS.
JAMES H. THOMAS.

REFERENCES CITED

The following references are of record in the file of this patent:

UNITED STATES PATENTS

| Number | Name | Date |
|---|---|---|
| 1,933,322 | Fagan | Oct. 31, 1933 |
| 2,420,372 | Heidbrink | May 13, 1947 |

FOREIGN PATENTS

| Number | Country | Date |
|---|---|---|
| 698,045 | Germany | Oct. 31, 1940 |